United States Patent [19]
Burnett

[11] 4,083,464
[45] Apr. 11, 1978

[54] KNOCKDOWN REUSABLE CONTAINER

[76] Inventor: Robert A. Burnett, 1530 Eastlake East, Seattle, Wash. 98102

[21] Appl. No.: 716,074

[22] Filed: Aug. 20, 1976

[51] Int. Cl.² .............................................. B65D 9/12
[52] U.S. Cl. .................................... 217/13; 217/45; 217/24; 217/69; 220/4 F; 46/31
[58] Field of Search ............... 220/4 F; 217/69, 12 R, 217/12 A, 13, 45, 43 R, 24; 46/31

[56] References Cited

U.S. PATENT DOCUMENTS

| 1,335,060 | 3/1920 | Kenniker | 217/12 R |
| 1,953,763 | 4/1934 | Maurer, Jr. | 217/69 |
| 2,411,121 | 11/1946 | Wilson | 217/69 |
| 2,411,121 | 11/1946 | Wilson | 217/69 |
| 3,195,968 | 7/1965 | Freeman | 217/69 |
| 3,235,118 | 2/1966 | Kenley | 217/69 |
| 3,323,674 | 6/1967 | Nist, Jr. | 217/69 |
| 3,374,914 | 3/1968 | Adam | 220/4 F |

FOREIGN PATENT DOCUMENTS

| 18,920 of | 1889 | United Kingdom | 217/69 |
| 443,007 | 2/1936 | United Kingdom | 217/71 |

Primary Examiner—William Price
Assistant Examiner—Joseph M. Moy
Attorney, Agent, or Firm—Seed, Berry, Vernon & Baynham

[57] ABSTRACT

A container which may be repeatedly disassembled and reassemblied. The container is formed by several panels, each having portions of their edges notched to two different depths to form projecting, intermediate, and recessed steps which alternate with each other. The intermediate steps of each edge interfit with the projecting steps on the edge of an adjacent panel with the recessed steps of the two interfitting edges adjacent each other. The recessed steps receive a spring metal clip which extends from one panel to another. The clips have inwardly projecting tabs at each end which are inserted into a retaining groove on each panel adjacent the recessed steps. The clip overlies panel indentations which allow a pry bar to be positioned beneath the clip for removal of the clips from the grooves.

4 Claims, 4 Drawing Figures

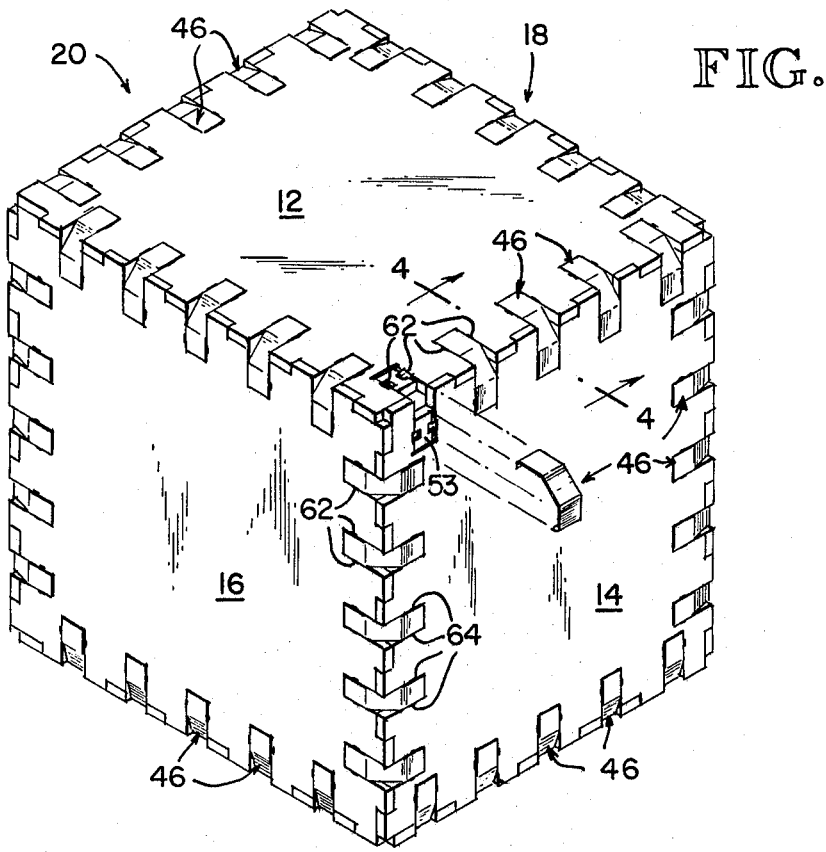
FIG. 1
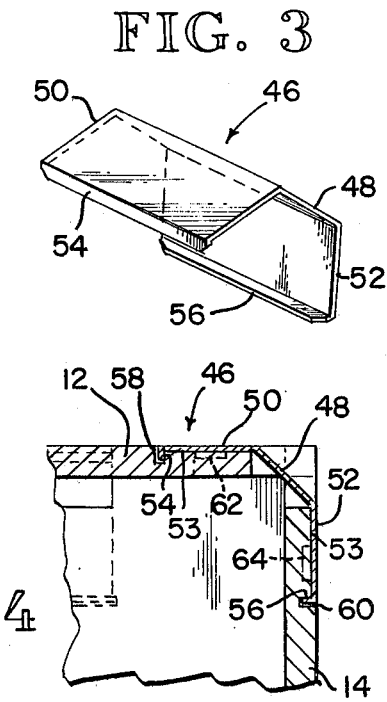
FIG. 3
FIG. 4
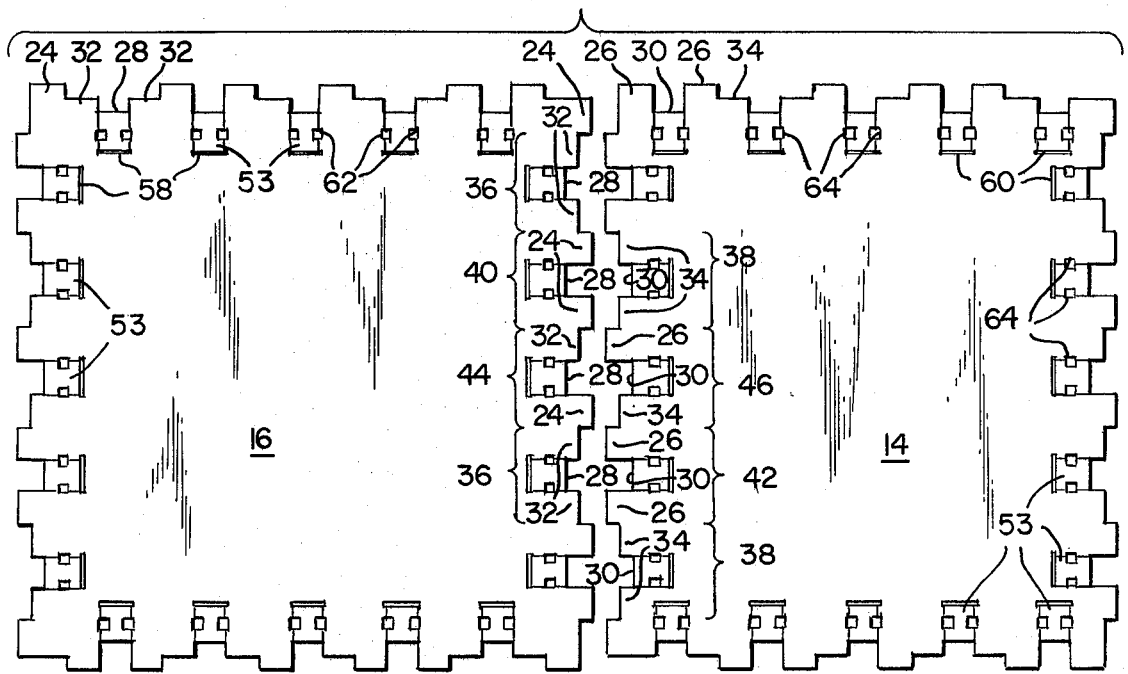
FIG. 2

KNOCKDOWN REUSABLE CONTAINER

BACKGROUND OF THE INVENTION

1. Field of the Invention

This invention relates to a knockdown reusable container and, more particularly, to a container assembled from several panels having interfitting edges and which are secured together by recessed, spring metal clips.

2. Description of the Prior Art

Various types of reusable shipping containers have been developed and are in common use. A serious disadvantage of many such containers is that they must be shipped back to the point of origin in order to be reused. The space required to ship such containers back to their point of origin may be reduced by using boxes formed from panels which may be disconnected from each other and stacked. Many of these existing knockdown containers are difficult to assemble and disassemble while others are not sufficiently sturdy to withstand shocks incurred during shipping. The concept of fabricating a knockdown container from panels having notched edges which interlock with each other is well known in the art. Examples of such containers are disclosed in U.S. Pat. No. 3,692,201 issued to Garduna and U.S. Pat. No. 3,599,822 issued to Johnson.

The use of edge clips to join panels together is also conventional as evidenced by U.S. Pat. No. 933,846 issued to Mengel and U.S. Pat. No. 3,323,674 issued to Nist, Jr. However, a serious disadvantage of these panel structures is that the clips project above the surface of the panels thereby preventing the containers from freely sliding past each other. Furthermore, as the clips of one container strike the clips of another container, the clips may be inadvertantly removed from the container causing the container to break apart during shipment. Another disadvantage of prior art knockdown containers utilizing edge clips is that the clips are not easily removed thus increasing the time and effort required to disassemble the container.

Although U.S. Pat. No. 3,374,914 issued to Adam does provide a recessed strap for holding the panels together, the structure for recessing the strap is not formed in the same operation as the panel notching but must be performed in a separate manufacturing step. Furthermore, the shipping container disclosed in the Adam patent does not utilize a clip, but instead utilizes a strap with which extends completely around the periphery of the container.

SUMMARY OF THE INVENTION

It is an object of this invention to provide a system for releasably securing several panels to each other to form a strongly constructed knockdown reusable container.

It is another object of the invention to provide panels which have their edges notched so that adjacent edges interlock with each other and also form a recess for receiving spring metal clips for holding the panels together.

It is still another object of the invention to offset the notches at opposite edges of each panel so that the panels may fit together regardless of their orientation.

It is a further object of the invention to provide a panel structure which allows the clips to be easily removed from the panels, thereby allowing the container to be quickly and easily collapsed.

These and other objects of the invention are accomplished by a container constructed of panels having notched edges which interfit with each other. The notches on opposite edges of the panels are offset such that any panel may interfit with any corresponding edge of another panel. The panels are joined together by resilient clips which fit into recesses along the interfitting edges to prevent inadvertant removal of the clips. Each clip overlies an indentation in one of the joined panels for allowing insertion of a bar beneath the clip to pry the clip from the panel to facilitate disassembly of the box.

BRIEF DESCRIPTION OF THE DRAWINGS

FIG. 1 is an isometric view of an assembled container with one clip separated from the container.

FIG. 2 is a plan view of two panels from the container of FIG. 1.

FIG. 3 is an isometric view of a spring metal clip used to join the panels together.

FIG. 4 is a partial cross sectional view taken along the line 4—4 of FIG. 1.

DETAILED DESCRIPTION OF THE INVENTION

With reference to FIGS. 1 and 2, the knockdown reusable container is constructed from a plurality of panels 12, 14, 16, 18, 20, and 22. As best illustrated in FIG. 2, the edges of the panels 12, 14 are notched to form a stepped, irregular edge. The notches extend inwardly to two different depths to form projecting steps 24, 26, recessed steps 28, 30 and intermediate steps 32, 34 on panels 12, 14, respectively. The projecting, intermediate, and recessed steps are arranged in a series such that each series includes a first subseries 36, 38 a second subseries 40, 42 and a third subseries 44, 46 on panels 12, 14 respectively. The first subseries 36, 38 includes a pair of intermediate steps 32, 34 separated by recessed steps 28, 30. The second subseries 40, 42 includes a pair of projecting steps 24, 26 separated by recessed steps 28, 30 and the third subseries 44, 46 includes recessed steps 28, 30 with an intermediate step 32, 34 on one side thereof and a projecting step 24, 26 on the other side thereof. The series formed on the edge of one panel 12 is offset from the series formed on the edge of the other panel 14 such that the first subseries 36, 38 is adjacent the second subseries 40, 42 and the third subseries 44, 46 is opposite the third subseries of its adjacent panel. In all cases, the recessed steps 28 of one panel 12 are adjacent with the recessed steps 30 of the other panel 14. When the panels are assembled as illustrated in FIG. 1, the interfitting projecting and intermediate steps form a uniform edge spaced apart by the adjoining recessed steps 28, 30. For each panel, the first subseries on each edge are directly across from the second subseries on the opposite edge such that the intermediate steps of the first subseries are opposite the projecting steps of the second subseries. Similarly, the third subseries on opposite edges are directly across from each other such that the intermediate steps on the edges are opposite the projecting step on the opposite edges. As a result, the panels may be joined together with either one or two opposite edges abutting each other thereby simplifying assembly of the container.

Each of the adjoining recessed steps 28, 30 receive a clip 46 illustrated in greater detail in FIGS. 3 and 4. The clip 46 is preferably fabricated from a rectangular sheet of spring metal although any other resilient material such as plastic may also be used. The clip 46 includes a central portion 48 extending from one panel to the other across the recessed edges thereof and a pair of end portions 50, 52 which meet the central portion 48 at acute angles. As best illustrated in FIG. 4, the end portions 50, 52 lie within recessed strips 53 in the outer surfaces of the panels 14, 16. Tabs 54, 56 extend inwardly from the end portions 50, 52 at approximately right angles. The tabs 54, 56 are received in grooves 58, 60 in the panels 16, 14 respectively, adjacent the recessed steps 28, 30. Indentations 62, 64 are formed in the panels beneath the clips 48 so that the side edges of the clips 48 partially overlie the indentations 62, 64 to allow a bar (not shown) to be inserted underneath the clip 46 to pry the tabs 54, 56 from the grooves 58, 60. Although the indentations 62, 64 are illustrated here as being rectangular and extending only part way beneath the clip 48, it will be understood that indentations having other forms may also be used. However, if the indentation extends from one side of the clip to the other, it is difficult to slide the tab of the clip along the outer surface of the panel without catching the tab in the indentation. Similarly, although the panels are illustrated as each having indentations adjacent their recessed steps, only one indentation is required for each clip. However, by placing indentations on both adjoining panels, either tab 54, 56 may be removed first.

The panels 12-22 may be fabricated from a wide variety of material including wood, plastic, and metal. The panels may be initially formed with smooth edges which are subsequently notched, or the notches may be initially formed in the panel when the panel is molded on cast.

In use, the side and bottom panels 14, 16, 18, 20, 22 are assembled by interfitting the projecting and intermediate steps and joining the panels together with clips. The object to be transported in the container is then placed therein and the top panel 12 is joined to the side panels with clips. When the container reaches its destination, the top panel 12 is removed by inserting a bar into the indentations 62, 64 beneath the clips associated with the top panel 12, and the tabs adjacent the indentations are pryed from the clip retaining grooves thereby allowing the remaining tabs to be manually withdrawn from the other grooves. After the contents of the container have been removed, the container may be refilled, the top panel may be resecured to the side panels and the container may be reshipped. Alternately, remaining clips may be pried from the panels thereby allowing the panels to be stacked into a compact unit for storage or reshipment to the initial shipping point. During shipment the recessed notches and strips protect the clips from accidental removal and allows the containers to slide past each other.

The embodiments of the invention in which a particular property or privilege is claimed are defined as follows:

1. A knockdown reusable container, comprising:
    a plurality of panels, each having notched edges including notched and projecting steps interfitting with the projecting and notched steps respectively on the edges of adjacent panels to form a rectangular parallel piped, said panels further including a plurality of clip receiving notches spaced apart along the edges aligned with each other, clip retaining groove positioned adjacent each clip receiving notch, and a trough recessed in the outer surface of said panels between each clip retaining groove and said clip receiving notch; and a resilient retaining clip having a pair of planar end portions arranged substantially perpendicular to each other, a central portion having a width approximately equal to the width of said clip retaining notches extending between said end portions with said central portion intersecting said end portions at obtuse angles, and a retaining tab extending inwardly from the end of each end portion of said clip, said clips being positioned on said panels with said central portions extending from one panel to an adjacent panel with the edges of said central portions abutting the inside surfaces of the respective clip receiving notches, said end portions overlying respective recessed troughs on said panels such that the outer surfaces of said end portions are recessed beneath the outer surfaces of said panels, and said retaining tabs being inserted in respective clip retaining grooves to restrict removal of said clips from said panels while increasing the wracking strength of said container and providing said container with a planar outer surface.

2. The knockdown resuable container of claim 1 wherein an end portion of each clip partially overlies a pair of spaced apart indentations on opposite sides of said end portion and draw the retaining tab projecting therefrom directly away from said panel.

3. The knockdown resuable container of claim 1 wherein the notched edges for each panel form a repeating series of steps, each of said series including a recessed step forming said clip receiving recess, a first step projecting outwardly from said recessed step by a first distance and a second step projecting outwardly from said first step by said first distance, the series of one edge being offset from the series of an adjacent edge such that the second step of each edge is opposite the first step of the edge of the adjacent panel, and the recessed steps of adjacent edges are opposite each other.

4. The knockdown reusable container of claim 3 wherein said series includes a first subseries having a pair of said first steps separated by a recessed step, a second subseries having a pair of said second steps separated by a recessed step, and a third subseries having a recessed step positioned between a first step and a second step, said subseries being arranged such that the first subseries for each edge is opposite the second subseries of an adjacent edge, and the third subseries for each edge is opposite a third subseries of an adjacent edge such that the recessed steps of one edge are opposite the recessed steps of the adjacent edge, and the interfitting first and second steps form a uniform edge having a plurality of said recessed steps spaced apart along the length thereof.

* * * * *